(No Model.)

H. H. WESTINGHOUSE.
TRIPLE VALVE FOR AUTOMATIC AIR BRAKES

No. 475,099. Patented May 17, 1892.

WITNESSES:

INVENTOR,
H. H. Westinghouse

UNITED STATES PATENT OFFICE.

HENRY H. WESTINGHOUSE, OF PITTSBURG, PENNSYLVANIA, ASSIGNOR TO THE WESTINGHOUSE AIR BRAKE COMPANY, OF SAME PLACE.

TRIPLE VALVE FOR AUTOMATIC AIR-BRAKES.

SPECIFICATION forming part of Letters Patent No. 475,099, dated May 17, 1892.

Application filed August 31, 1891. Serial No. 404,208. (No model.)

*To all whom it may concern:*

Be it known that I, HENRY HERMAN WESTINGHOUSE, a citizen of the United States, residing at Pittsburg, in the county of Allegheny and State of Pennsylvania, have invented or discovered a certain new and useful Improvement in Triple Valves for Automatic Air-Brakes, of which improvement the following is a specification.

My present invention relates to quick-action triple valves of the class or type which is exemplified in Letters Patent of the United States No. 376,837, granted and issued to George Westinghouse, Jr., under date of January 24, 1888; and its object is to enable the release of the brakes after a "quick-action" or "emergency" application to be effected more readily and promptly than heretofore, as well as to reduce the quantity of air required to be supplied to the train-pipe in effecting such release.

To this end my invention, generally stated, consists in the combination, with the supplemental valve and valve-chamber of a quick-action triple valve, of a leakage-port leading from said chamber to a train-pipe connection, a leakage-valve controlling said port, and a closing-spring bearing on said valve.

The improvement claimed is hereinafter fully set forth.

Figure 1:
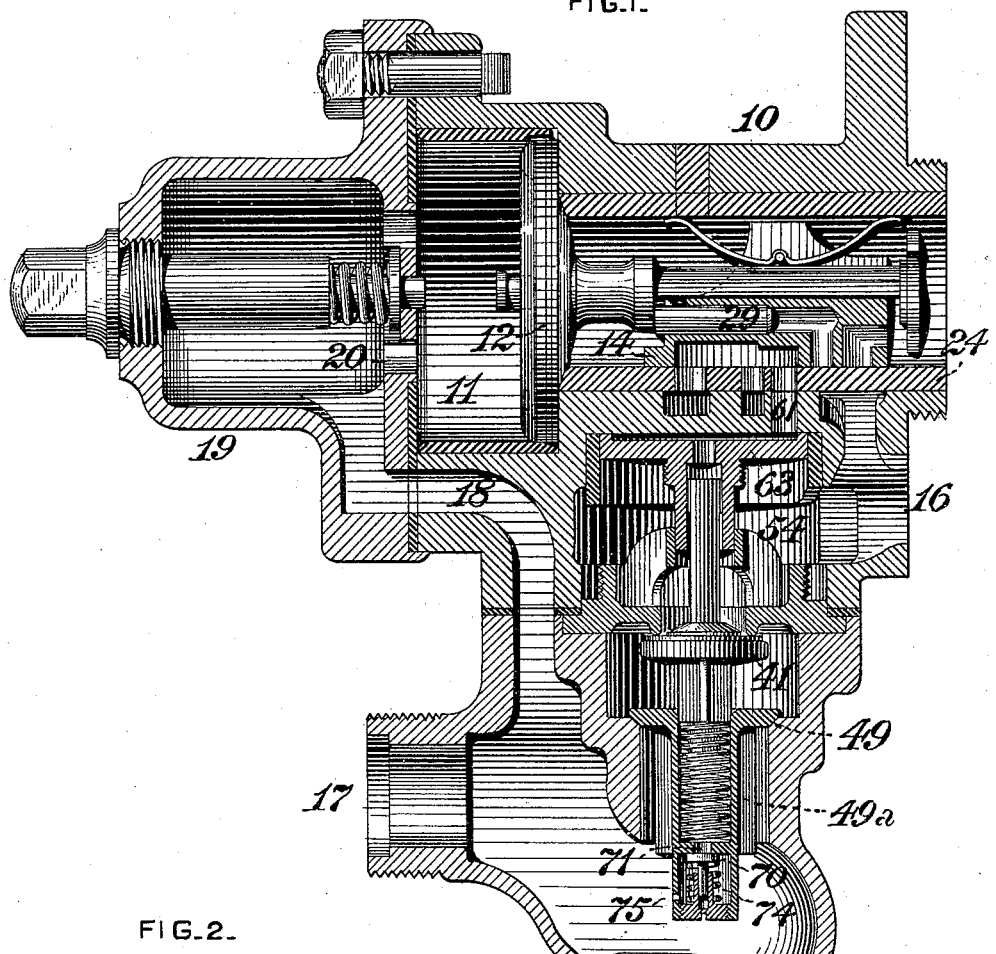
Figure 2:
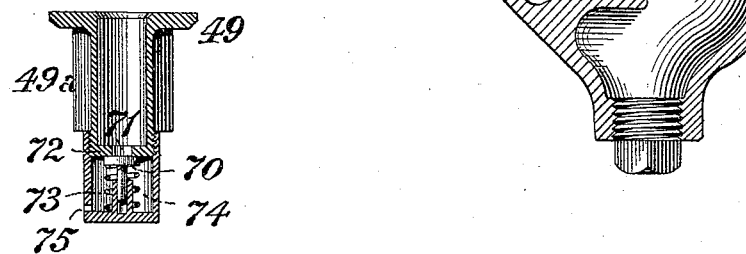

In the accompanying drawings, Figure 1 is a longitudinal central section through a triple valve embodying my invention, and Fig. 2 a similar section through the check-valve and leakage-chamber detached.

My invention is herein illustrated as applied in a quick-action triple valve, which is otherwise than as to such application in all essential particulars substantially similar to one of the forms described and shown in Letters Patent No. 376,837 aforesaid, and which need not, therefore, be fully and at length described.

In the operation of quick-action triple valves of the above and other structural types the combined pressure in the brake-cylinder after a quick-action application of the air which is taken from the auxiliary reservoir and that taken from the train-pipe is greater than that in ordinary applications by the amount of air taken from the train-pipe and a comparatively high degree of excess of reserve pressure is required in the main reservoir in order to promptly release the brakes, and a longer period is required for release if such high degree of excess pressure is not maintained in the auxiliary reservoir. This augmentation of brake-cylinder pressure in quick-action or emergency stops involves a smaller difference between the main reservoir and auxiliary-reservoir pressures, and not only is there a greater quantity of air required to raise the train-pipe pressure to the degree normal and proper for release, but such pressure must be higher than under other conditions, the auxiliary-reservoir pressure being higher.

My invention is designed to facilitate the release of the brakes by the provision of means for effecting an increase of train-pipe pressure on the one hand and a reduction of auxiliary-reservoir pressure on the other after a quick-action application by a slight and gradual leakage of air from the auxiliary reservoir and brake-cylinder to the train-pipe. To this end I provide a leakage-valve 70, which is normally held to its seat by a spring 73 and controls the leakage of air from the auxiliary reservoir and brake-cylinder to the train-pipe, past the supplemental or quick-action valve 41, and through a small leakage-port 75, leading into the train-pipe connection from the chamber 54 of the quick-action valve 41. The port 75 is of such small diameter as to be incapable of permitting a sufficiently great or sudden flow of air from beneath the quick-action valve to cause the latter to open suddenly or fully, and the closing-spring 73 must be of such tension as to hold the valve 70 to its seat, and thereby prevent such leakage of air through the port 75 as would interfere with the maintenance of normal pressure in the brake-cylinder. In the instance shown the leakage-valve 70 is fitted to work in the hollow stem 49$^a$ of the check-valve 49 and controls a passage 71, leading from the upper portion thereof, which is open to the chamber of the quick-action valve 41 into a lower compartment 74, in which the leakage-port 75 is formed, such specific location and arrangement of the valve being one which is of ready and convenient application in existing structures. It will, however, be obvious that, if preferred, the leakage-port may be located in the wall of the valve-chamber adjoining the passage leading to the train-pipe connection 17.

I claim as my invention and desire to secure by Letters Patent—

1. In a quick-action triple valve, the combination of a leakage-port opening into a passage leading to the train-pipe connection, a valve controlling the flow of air from the quick-action-valve chamber to said port, and a closing-spring acting to hold said valve normally to its seat, substantially as set forth.

2. In a quick-action triple valve, the combination of a check-valve controlling the flow of air from the quick-action-valve chamber to the train-pipe connection, a hollow stem fixed to said check-valve, a chamber connected to said valve-stem, a valve controlling a passage from the bore of the stem to said chamber, a closing-spring acting to hold said valve normally to its seat, and a leakage-port leading from said chamber to a passage communicating with the train-pipe connection, substantially as set forth.

In testimony whereof I have hereunto set my hand.

H. H. WESTINGHOUSE.

Witnesses:
R. H. WHITTLESEY,
J. SNOWDEN BELL.